Feb. 2, 1965    J. W. MOORE ETAL    3,168,672
ELECTRODE POSITIONING MEANS
Filed Aug. 8, 1961    3 Sheets-Sheet 1
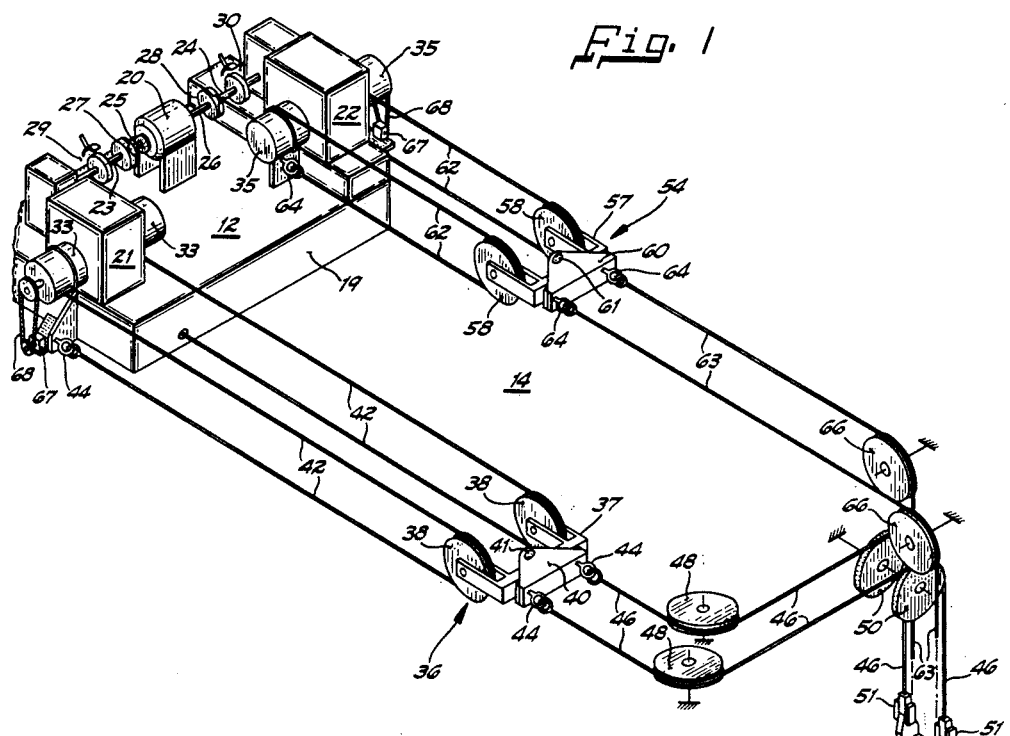
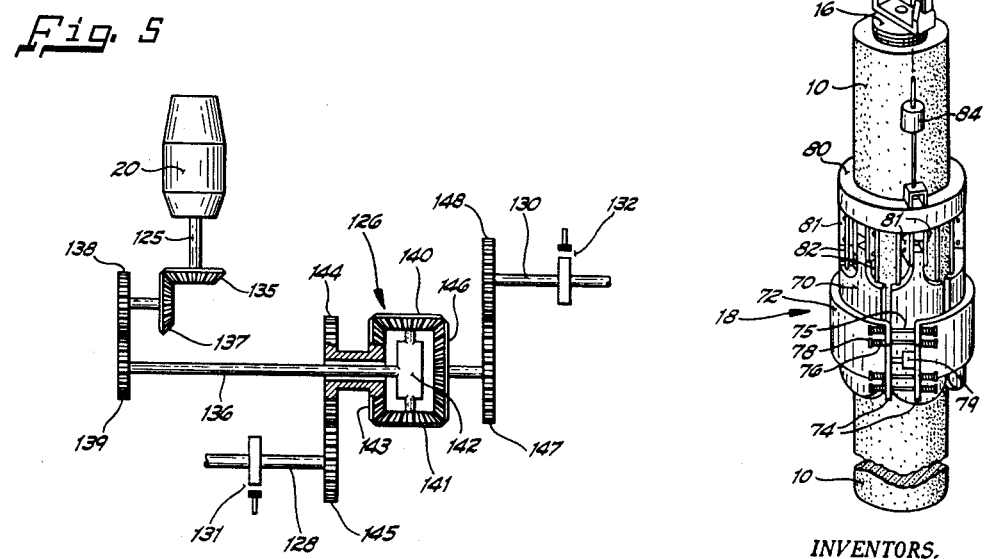
INVENTORS.
JAMES WRIGHT MOORE
ROBERT F. EDGAR
BY Fred Wiviott
ATTORNEY Feb. 2, 1965  J. W. MOORE ETAL  3,168,672
ELECTRODE POSITIONING MEANS
Filed Aug. 8, 1961  3 Sheets-Sheet 2

INVENTORS.
JAMES WRIGHT MOORE
ROBERT F. EDGAR
BY
Fred Wiviott
ATTORNEY

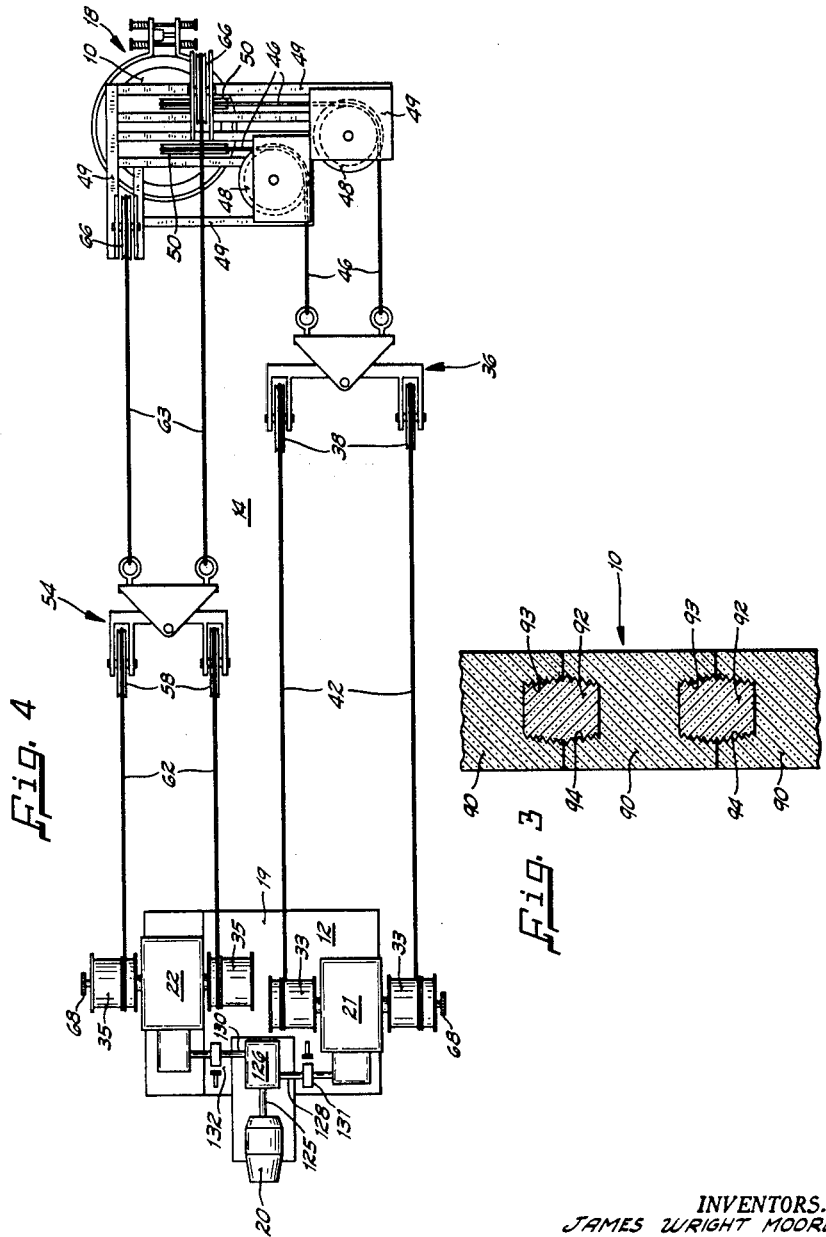

United States Patent Office 3,168,672
Patented Feb. 2, 1965

3,168,672
ELECTRODE POSITIONING MEANS
James Wright Moore and Robert F. Edgar, both of Pittsburgh, Pa., assignors to McGraw-Edison Company, Milwaukee, Wis., a corporation of Delaware
Filed Aug. 8, 1961, Ser. No. 130,139
2 Claims. (Cl. 314—69)

This invention relates to electric furnaces and, more particularly, to means for supporting and positioning an electrode relative to the charge in an electric arc furnace.

In certain types of electric arc furnaces, the electrodes are supported and positioned relative to the furnace charge by means of cables and motor powered drums or winches driven in accordance with variations in the electrode voltage and current. The cables are affixed to a plug attached to the end of the electrode and an electrode clamp secured intermediate the electrode's ends. Because such electrodes are consumed, worn off and broken away during normal furnace operation, it becomes necessary periodically to move the clamp to a higher location on the electrode. This is accomplished by loosening the clamp and pulling in the cables connected to it while the cables connected to the electrode are held stationary, thereby moving the clamp outwardly relative to the furnace. After the clamp has reached its new location it is reclamped and normal operation may then resume. This procedure is called slipping the electrode.

When it is desired to add an additional section to the electrode, the plug is removed from the upper end thereof and the cable connected to it is reeled in to a position clear of the new section which is then added. The plug is then lowered and inserted into the top of the added section. During this operation, the cables connected to the electrode holder or clamp are held stationary.

Prior art electrode positioning apparatus of this type required a plurality of independent motors for positioning and slipping the electrode. Such apparatus generally required several floors of headroom above the furnace.

It is an object of the invention to provide a new and improved apparatus for supporting and regulating an electrode and for slipping the electrode relative to its clamp or holder.

Another object of the invention is to provide an electrode positioning apparatus for a cable supported electrode which may be housed on a single floor.

A further object of the invention is to provide means for supporting, regulating and slipping an electrode in which only a single positioning motor is required.

These and other objects and advantages of the invention will become more apparent from the detailed description thereof taken with the accompanying drawings in which:

FIG. 1 is a perspective view of the holding and positioning apparatus according to the preferred embodiment of the instant invention;

FIG. 3 is a cross-sectional view of a portion of an electrode;

FIG. 4 is a top plan view of an alternate embodiment of the instant invention; and FIG. 5 schematically illustrates a portion of the embodiment of FIG. 4.

Figure 2:
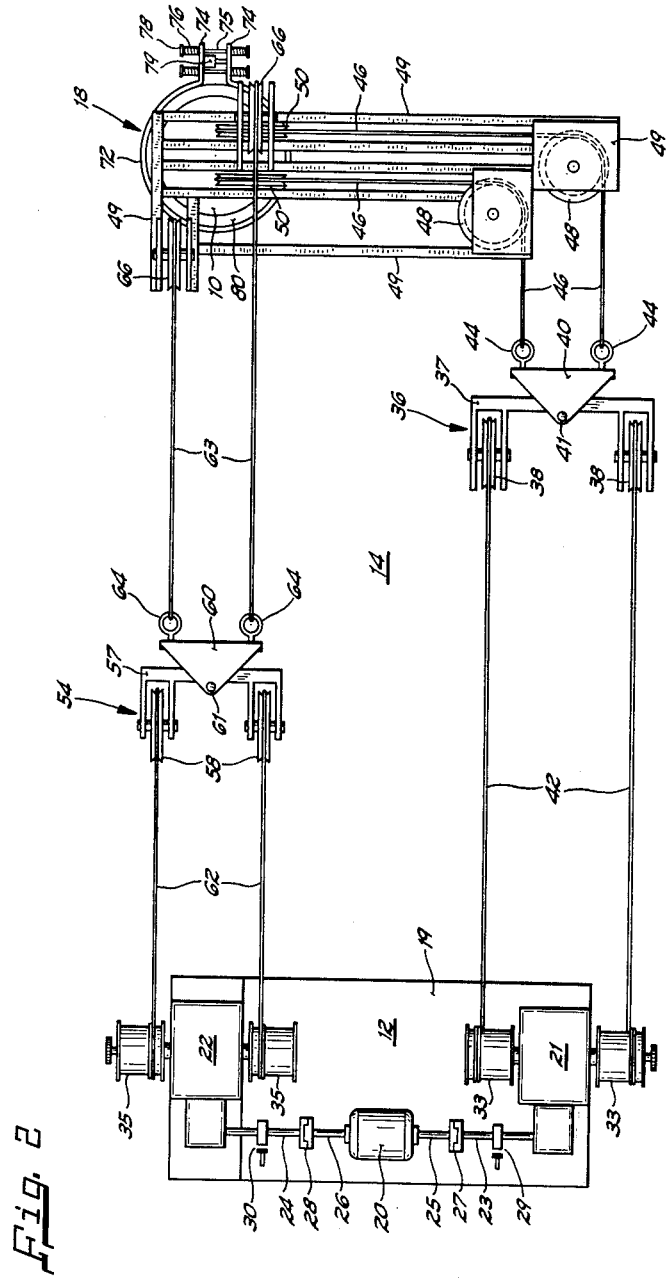
FIG. 2 is a top plan view of the apparatus shown in FIG. 1.

In general terms, the invention comprises in an electric arc furnace having an electrode and an electrode clamp releasably coupled to the electrode, the combination of a reversible motor, first and second output means coupled to the electrode and the electrode holder respectively. In addition, means are provided for operatively coupling the motor to each of the output means for simultaneous operation and for selectively actuating one of the output means from the motor independently of the other. According to a more specific aspect of the invention, means are provided for selectively locking one of the first and second output means so that the electrode and the holder may be moved independently of each other relative to the furnace.

According to one embodiment of the instant invention, the coupling means comprises a clutch disposed between the motor and each of a pair of output shafts. In addition, the selective locking means comprises a brake operative to engage each of the output shafts so that each shaft may be uncoupled from the motor and locked in position while the other shaft remains coupled to the motor for operation thereby.

Referring now to the drawings in greater detail, FIG. 1 shows an electrode 10 of an electric arc furnace (not shown) connected to a hoisting mechanism 12 by a suspension system 14. The suspension system is connected to the electrode 10 by means of a plug 16 screwed into a threaded hole on the end of the electrode and an electrode clamp assembly 18 which compressively embraces the electrode 10 intermediate its ends. It will be appreciated that in a polyphase system, there will be an electrode and supporting and positioning assembly for each phase.

As best seen in FIG. 2, the hoisting mechanism 12 is mounted on a frame 19 and includes a reversible motor 20 whose speed and direction of rotation is controlled in accordance with the voltage and current conditions of the electrode 10. A regulating system for controlling the motor 20 in accordance with the electrical conditions in the electrode 10 are well known in the art and form no part of the instant invention and, accordingly, has not been illustrated for the sake of brevity. It will be sufficient for the purposes of this discussion to state that when the arc between the electrode and the furnace charge becomes too long, as indicated by an increase in arc voltage and a decrease in arc current, the motor 20 will turn in a first direction causing the electrode to be lowered toward the charge to thereby reduce the arc length. Conversely, when the arc becomes too short as indicated by an increase in arc current and a decrease in arc voltage, the motor 20 will rotate in an opposite direction thereby raising the electrode 10. For purposes which will become apparent from the ensuing discussion, motor 20 may be selectively connected for automatic operation by the regulating circuit or manually switched to energizing circuits for operation in either an electrode raising or an electrode lowering direction.

As shown in FIGS. 1 and 2 which illustrate the preferred embodiment of the invention, a pair of speed reducing mechanisms 21 and 22 are adapted to be driven by the motor 20 through the agency of a pair of output shafts 23 and 24 which are releasably coupled to the motor shafts 25 and 26 by clutches 27 and 28 respectively. In addition, the output shafts 23 and 24 are respectively provided with brakes 29 and 30. The details of the speed reducing mechanisms 21 and 22 have not been shown and form no part of the invention, but may be of any well known type. For the purpose of this discussion, it is sufficient to state that the mechanisms 21 and 22 are constructed and arranged to rotate in opposite directions and each has a pair of output drums 33 and 35 respectively. Similarly, clutches 27 and 28 and brakes 29 and 30 may be of any well known type and may be individually and selectively actuated in any well known manner.

The suspension system 14 includes a first sheave assembly 36 having a sheave carrier 37 which supports a pair of parallel sheaves 38 and a yoke 40 which is pivotally connected to the sheave carrier 37 by means of a pin 41. Cables 42 extend around each of the sheaves 38 and are connected at one end to each of the drums 33 and are deadended at their other end to an eyebolt 44 affixed to the frame 19 at a point below its corresponding drum 33. As seen in FIG. 1, cables 42 extend from the underside of drums 33 to sheaves 38 so that rotation of said drums in a clockwise direction will reel in the cables 42 to thereby move the sheave assembly 36 to the left or toward the assembly 12. Conversely, rotation of drums 33 in a counterclockwise direction will feed the cables 42 out thereby allowing the sheave assembly 36 to move toward the right.

A pair of eyebolts 44 affixed to the front of the yoke 40 support a pair of cables 46 which extend around a first pair of adjacent disposed sheaves 48 which are each horizontally mounted for rotation on a frame 49 around a fixed vertical axis. In addition, cables 46 also extend around a second pair of coaxial sheaves 50 which are rotatably mounted in frame 49 about a fixed horizontal axis. The lower ends of the cables 46 are attached to a pair of vertical arms 51 which are integral with the plug 16. It will be appreciated, therefore, that movement of the sheave assembly 36 to the left, under the influence of clockwise rotation of the drums 33, will raise the electrode 10 vertically and, conversely, counterclockwise rotation of drums 33 will lower electrode 10 toward the furnace (not shown).

The second sheave assembly 54 is similar to assembly 36 and includes a sheave carrier 57, a pair of sheaves 58 and a yoke 60 pivotally connected by a pin 61 to the sheave carrier 57. A cable 62 extends around each of the sheaves 58 and each is connected at one end to the drums 35 of the speed reducing mechanism 22 and at their other ends to an eye-bolt 64 affixed to the frame 19 below the drums 35. A second pair of cables 63 are connected to eye-bolts 64 affixed to the front of a yoke 60 pivotally mounted by a pin 61 to sheave carrier 57. In addition, the cables 63 extend around a pair of vertically disposed sheaves 66 which are mounted on frame 49 for rotation about fixed horizontal axes and thence downwardly to the electrode clamp 18. As seen in FIG. 1, the cables 62 extend around the upper side of the drums 35 so that rotation of said drums in a clockwise direction will allow the sheave assembly 54 to move toward the right to lower the electrode 10. Conversely, counterclockwise rotation of drums 35 will move the sheave assembly 54 to the left whereby the electrode 10 is raised. A pair of limit switches 67 are connected to each of the drums 33 and 35 by chains 68 to prevent overtravel of the sheave assemblies 36 and 54.

The electrode clamp 18, as shown in FIG. 1, includes a plurality of contact shoes 70 which are composed of an electrical conductive material such as copper and which are held in high pressure engagement with the surface of electrode 10 by a clamping band 72. The band 72 surrounds the contact shoes 70 and has a pair of radially extending clamping lugs 74 which are disposed at each of the free ends of the band 72. A plurality of tie bars 75 extend through aligned openings in each of the lugs 74 and each carries a pair of compression springs between a head 78 on each of its outer ends and the outer surfaces of each of the lugs 74. As a result, springs 76 tend to move the lugs 74 toward each other to thereby clamp the contact shoes 70 against the surface of the electrode 10 to permit the transfer of electric current therebetween and also to support the weight of said electrode. A piston and cylinder assembly 79 is disposed between the lugs 74 and is operative upon being pressurized to force said lugs apart in opposition to the springs 76 and thereby release the contact shoes 70 from high pressure engagement with the electrode 10. This allows relative sliding movement between the clamp 18 and the electrode 10.

Each of the contact shoes 70 is pivotally connected at its upper end to a bus ring 80 by an arm 81. A plurality of copper tubes 82, extending between the ring 80 and the contact shoes 70, provide an electrical current path therebetween. The bus ring 80 is, in turn, connected to a source of electrical energy by flexible cables and bus bars, which are not shown but are well known in the art. An electrical insulating member 84 is interposed in the cable 63 to insulate the suspension assembly 14 from the bus ring 80 while the plug 16 is also suitably insulated from the cables 46.

During automatic operation of the system, the brakes 29 and 30 are off and the clutches 27 and 28 are engaged. Thus, a signal to change the position of the electrode 10 energizes the motor 20 to drive each of the speed reducing mechanisms 21 and 22. Since the electrode holder 18 is mechanically coupled to the electrode 10 by means of a clamping band 72, tension on cables 46 and 63 will be substantially equal so that the electrode and clamp are moved in unison.

When it is desired to slip the electrode 10 relative to the clamp 18, or in effect to hold the electrode stationary and raise the clamp to a new position, the brake 29 is engaged to lock the electrode 10 in position and then the clutch 27 is released to prevent the shaft 23 from being rotated by the motor 20. With the sheave assembly 36 thus locked, the piston and cylinder assembly 79 is then pressurized to release the clamp 18. The motor 20 is then operated in a direction which rotates the drums 35 in a counterclockwise direction thereby moving the sheave assembly 54 toward the left as viewed in FIGS. 1 and 2. This moves the clamp 18 vertically relative to electrode 10 through the agency of the cables 63. When the new position of the clamp 18 is reached the pressure on the cylinder assembly 79 is removed thereby returning clamping pressure between the contact shoes 70 and the surface of the electrode 10. Clutch 27 is then re-engaged and brake 29 is released so that automatic operation of the assembly may proceed in the normal manner.

As seen in FIG. 3, the electrode 10 is composed of a plurality of cylindrical sections 90 which are endwise connected by means of a threaded plug 92 and a pair of tapped holes 93 and 94 at the lower and upper ends respectively of each section. When the electrode 10 has been consumed to the point where an additional section 90 is required, brake 30 is engaged and clutch 28 is released thereby uncoupling the shaft 24 from the motor 20 and locking it to prevent vertical movement of the electrode clamp 18 so that the electrode 10 is held in position. The motor 20 is then operated in a direction which will drive drums 33 in a counterclockwise direction to remove the tension from cables 46. The plug 16 is then removed from the tapped hole 94 in the uppermost section 90 and the motor 20 is operated to move the sheave assembly 36 to the left, as viewed in FIGS. 1 and 2, thereby raising the plug 16 until it will clear the new section 90 which is then added. The plug 16 is then lowered toward and affixed to the hole 94 in the upper end of the added section 90. Tension is then returned to the cables 46, the clutch 28 is engaged and the brake 30 is released. The assembly is again ready for automatic operation.

If it is desired to slip the electrode without removing the power flow thereto, the brake 30 is engaged and the clutch 28 is released to hold the clamp 18 stationary. Motor 20 is then operated in a direction to produce a slight amount of slack in cables 46 and brake 29 is engaged and clutch 27 released. Pressure is then applied slowly to the cylinder assembly 79 until the electrode slips down through the clamp 18 and returns tension to the cables 46. While the clamping pressure between the contact shoes 70 and the electrode 10, during this procedure, is insufficient to support the weight of the electrode, it is enough to maintain electrical contact. Clutch 28 is then engaged, brake 30 is released and the motor is operated in a direction to raise clamp 18 to its new position. After the cylinder 79 has been vented to return clamping pressure to the clamp 18, the clutch 27 is re-engaged and brake 29 released so that automatic operation may then proceed.

In the alternate embodiment of the invention, illustrated in FIG. 4, the motor 20 has a single output shaft 125 which is connected to a differential 126 having a pair of output shafts 128 and 130. The output shafts 128 of the differential 126 is coupled to the input of a first speed reducing mechanism 21 whose output, in turn, drives drums 33 in the manner discussed with respect to the embodiment of FIG. 1. Similarly, the second output shaft 130 of the differential 126 drives a second speed reducer 22 having a second pair of drums 35. Each of the output shafts 128 and 130 is provided with a brake 131 and 132 respectively. The suspension assembly 14 and electrode clamping assembly 18 in the embodiment of FIG. 4 are identical with the embodiment of FIGS. 1 and 2 and carry identical reference numerals and will not be explained in detail for the sake of brevity.

The differential 126, which is schematically illustrated in FIG. 5, is driven by a pinion 135 mounted on the end of the motor shaft 125. The pinion 135 drives a differential shaft 136 through gears 137, 138 and 139. Shaft 136 carries a pair of pinion gears 140 and 141 at the opposite end of a transverse arm 142 for driving the output shafts 128 and 130 through gears 143, 144, 145 and 146, 147, 148 respectively. It can be seen too that if either of the brakes 131 or 132 are engaged the differential 126 will drive the other shaft independently of the one that is held by its respective brake.

During automatic operation of the embodiment of FIGS. 4 and 5 the brakes 131 and 132 are off. Thus the signal to change the position of the electrode 10 energizes the motor 20 to drive the differential 126 which, in turn, drives the output shafts 128 and 130. The drums 33 and 35 are thereby rotated to move the sheave assemblies 36 and 54 in unison.

When it is desired to slip the electrode relative to the holder 18, with the embodiment of FIGS. 4 and 5, the brake 131 is engaged to prevent rotation of the output shaft 128. After the cylinder assembly 79 has been pressurized to release electrode clamp 18, the motor 20 is then operated in a direction which rotates the drums 35 in a counterclockwise direction to move the sheave assembly 54 toward the left as viewed in FIG. 4. The clamping assembly 18 is thereby moved vertically relative to the electrode 10 until its new position is reached. The cylinder assembly 79 is then vented to return clamping pressure to the contact shoes 70 and the brake 131 is then released so that automatic operation of the assembly may then resume. If it is desired to add an electrode section the brake 132 is engaged to hold the electrode by the clamp 18 and the electrode plug is raised through speed reducer 21 and inserted into the added section in a manner analogous to the apparatus of FIGS. 1 and 2.

Similarly for slipping under load, the brake 132 is engaged to hold the clamp 18 and pressure is applied to cylinder 79 after a slight amount of slack is produced in cables 46 and brake 131 has been engaged. When the weight of the electrode has returned tension to cables 46, brake 132 is released and the motor is then operated to raise clamp 18 to its new position. Normal operation may then resume after cylinder 79 is vented and the brake 131 released.

While only a few embodiments of the instant invention have been shown and described and while the invention has been illustrated and discussed with respect to a particular electrode suspension and clamp assembly, it is not intended that the invention be limited thereby but only by the scope of the appended claims.

We claim:

1. In an electric arc furnace having an electrode, the combination of a reversible electric motor having first and second output shafts, an electrode clamp for releasably engaging said electrode, a first cable assembly operatively connected to said electrode and having a first input shaft, a second cable assembly operatively connected to said electrode and having a second input shaft, a first clutch operatively connecting said first motor output shaft to said first input shaft and a second clutch operatively connecting said second motor output shaft to said second input shaft, said first and second cable assemblies being moved in an electrode raising direction upon the rotation of said motor in a first direction and an electrode lowering direction upon rotation of said motor in an opposite direction, and means for selectively breaking each of said first and second input shafts, so that said electrode and holder may be moved independently of each other upon the actuation of the clutch connected to one of said shaft means and upon the breaking thereof.

2. The device set forth in claim 1 wherein first and second speed reducing means are connected between each of said first and second input shafts and said first and second cable assemblies, respectively.

References Cited in the file of this patent

UNITED STATES PATENTS

| 353,564 | Kamm et al. | Nov. 30, 1886 |
| 1,065,380 | Marshall | June 24, 1913 |
| 1,671,475 | Keim | May 29, 1928 |

FOREIGN PATENTS

| 583,119 | Great Britain | Dec. 10, 1946 |
| 598,462 | Great Britain | Feb. 18, 1948 |